Jan. 20, 1931.　　　W. T. GUTH　　　1,789,929
MASHING UTENSIL
Original Filed Aug. 25, 1926
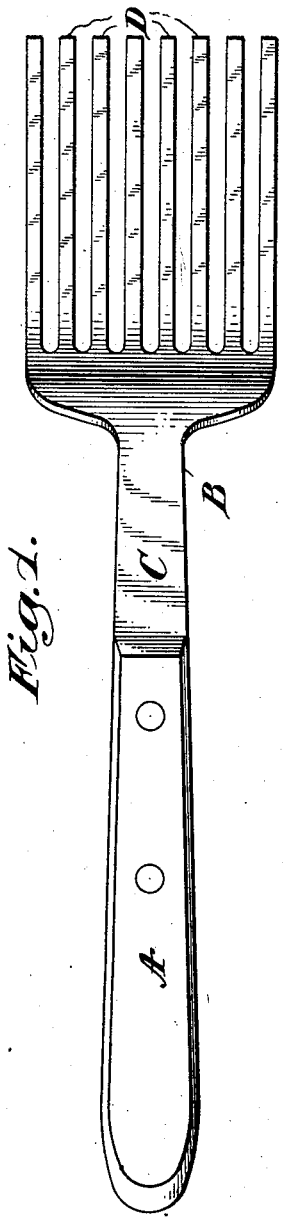
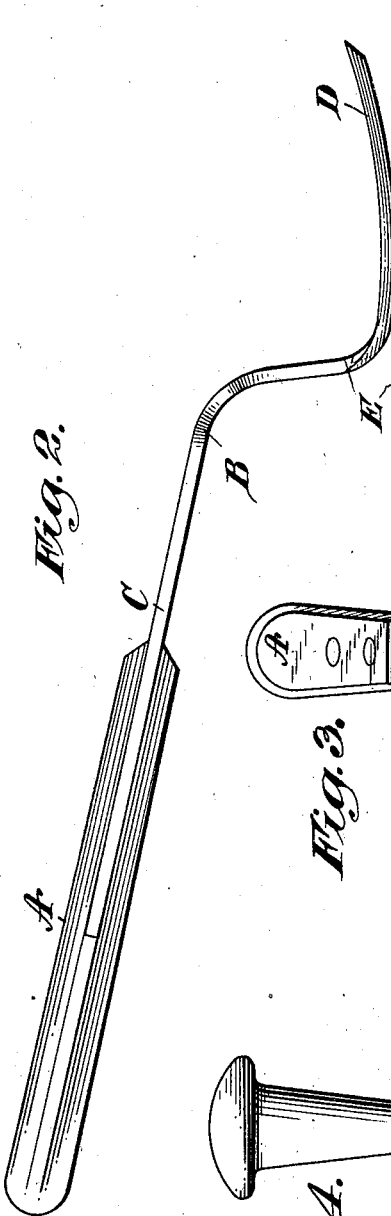
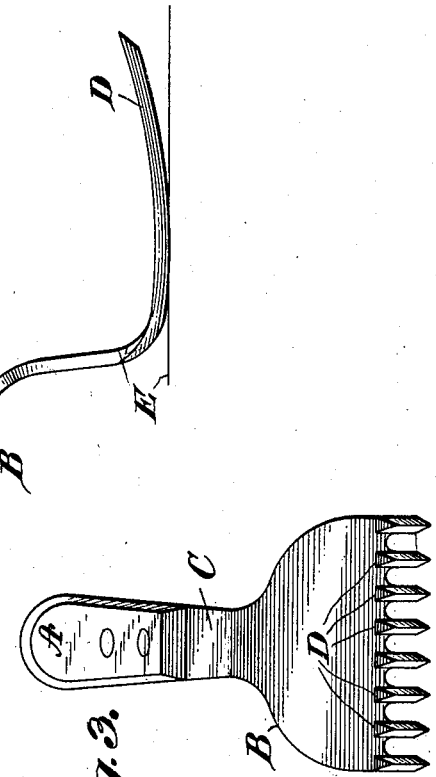
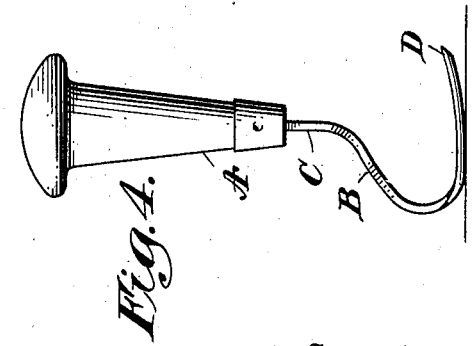
Inventor
William T. Guth
By his Attorney
Harry D. Morton Patented Jan. 20, 1931

1,789,929

UNITED STATES PATENT OFFICE

WILLIAM T. GUTH, OF NEW YORK, N. Y.

MASHING UTENSIL

Application filed August 25, 1926, Serial No. 131,418. Renewed June 20, 1930.

The following is a description of a mashing utensil embodying my invention in the form at present preferred by me; but it will be understood that various modifications and changes may be made therein without departing from the spirit of the invention and without exceeding the scope of the claim.

The invention relates to a culinary utensil for mashing food-stuffs, such as boiled vegetables and eggs, raw tomatoes, fruits, etc.; and has for one of its objects the provision of a utensil with which this work may be quickly and effectively accomplished. A further object of the invention is the provision of such a utensil which may be readily cleansed and which can be economically manufactured.

It is customary to employ for mashing purposes utensils provided with a plurality of widely-spaced wire elements, adapted to be forced flatwise through the material to be treated. Such devices are open to the objection that, when applied to food-stuffs which are resistant, rather than soft, considerable pressure is necessary to press the round wires through the material. Additionally, because of the wide spacing of these wires an effect is produced which is in the nature of a cutting of the material—rather than the crushing action which is required to quickly and effectually reduce it to the desired consistency. Some devices of this type are also objectionable from the point of view of being difficult to cleanse. Other utensils which are used for this purpose are spoon-shaped and provided with apertures through which the material is forced when pressure is applied thereto. Such devices do not work well on other than very soft material, for the reason that the area of the utensil which contacts with the material to be treated is large relative to the area of the apertures—thus requiring the application of much force in order to mash material which is in any marked degree resistant.

My invention will best be understood by reference to the accompanying drawings, wherein Fig. 1 is a top plan view of one form of the utensil; Fig. 2 is a side elevation thereof; Fig. 3 is a left-hand end elevation of Fig. 2; and Fig. 4 is a side elevation of a modified form of the device.

Like reference characters indicate like parts throughout the drawings.

Referring to the drawings: A is a handle, which may be of wood or other suitable material, and B is a tined member attached to said handle, and adapted to be stamped or forged from suitable material such as steel. Tined member B comprises a shank portion C and a plurality of closely-spaced tines, indicated by the reference character D. These tines are arcuate in contour and of triangular or wedge-shaped section—the line which defines the lower edge of the wedge also defining the convex side of the arc. Material to be mashed may be placed upon the surface of a dish, indicated by the reference character E of Fig. 2. Upon bringing the convex side of the utensil into contact with such material and applying a slight pressure thereto, the wedge-shaped tines D readily pass through the material, even though it be quite resistant to the action of a mashing device of the customary type. This is due to the fact that the area of the utensil surface applied directly to the material is relatively small, and also to the wedge action of the tines. Because of the close spacing of the tines and of the upwardly-converging sides thereof, the material, in the course of its passage between such tines, is subjected to lateral crushing pressure. Thus, with my invention the force employed is not expended in passing the tines through the material, but is largely utilized in applying lateral crushing pressure to such material as it passes between the tines. I have found that if the width of the spaces between the respective tines is not more than twice the width of each such tine, vegetables and similar materials are readily crushed by this lateral pressure. When the material has been partially broken down, the utensil may be given a rocking motion along the convex side of the tines, which are in contact with the surface of the plate—whereby great leverage is applied to the material. The result is that the crushing action is accentuated and the material is also subjected to a cutting action which insures its rapid reduction to a pulpy or otherwise desired consistency.

With the modified form of utensil illustrated in Fig. 4, direct downward pressure may be applied to the material, which is particularly desirable in the mashing of unusually resistant materials.

It will be obvious that the utensil may be much more readily cleansed than chopping machines and most other devices employed for this purpose.

In the embodiment of the invention shown in Figs. 1, 2 and 3, the tined member B is provided with a long shank so that the utensil may be employed for mashing material contained in a relatively deep dish.

What I claim as new and desire to secure by Letters Patent of the United States is:

A mashing utensil comprising a body portion, a plurality of parallel wedge-shaped tynes integral with said portion and extending generally in a direction substantially at right angles therefrom, the portion of said tynes immediately adjacent the body portion being sharply curved and merging into the plane of the body portion, and a handle extending from said body portion in a direction opposed to the direction of the tynes and at such an angle to the plane of the tynes as to permit the effective use of the said sharply curved portion of the tynes.

WILLIAM T. GUTH.